(12) United States Patent
Murayama et al.

(10) Patent No.: US 9,156,730 B2
(45) Date of Patent: Oct. 13, 2015

(54) INORGANIC FIBER AND METHOD FOR MANUFACTURING THE SAME

(75) Inventors: Kazutaka Murayama, Tokyo (JP); Jun Oikawa, Tokyo (JP); Kiyoshi Sato, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 188 days.

(21) Appl. No.: 13/990,364

(22) PCT Filed: Nov. 30, 2011

(86) PCT No.: PCT/JP2011/077612
§ 371 (c)(1),
(2), (4) Date: Aug. 13, 2013

(87) PCT Pub. No.: WO2012/073989
PCT Pub. Date: Jun. 7, 2012

(65) Prior Publication Data
US 2013/0327976 A1    Dec. 12, 2013

(30) Foreign Application Priority Data

Nov. 30, 2010   (JP) .................................. 2010-266381

(51) Int. Cl.
*C03C 13/00*   (2006.01)
*C04B 35/622*   (2006.01)
(Continued)

(52) U.S. Cl.
CPC ............... *C03C 13/00* (2013.01); *C04B 35/195* (2013.01); *C04B 35/20* (2013.01); *C04B 35/44* (2013.01); *C04B 35/62236* (2013.01);
(Continued)

(58) Field of Classification Search
CPC .......... C04B 35/04; C04B 35/10; C04B 35/14
USPC .................................................. 264/638, 639
See application file for complete search history.

(56) References Cited

U.S. PATENT DOCUMENTS 3,322,865 A  *  5/1967  Blaze, Jr. ........................ 264/0.5
4,010,233 A     3/1977  Winter et al.
(Continued)

FOREIGN PATENT DOCUMENTS

| | | |
|---|---|---|
| GB | 1 098 595 A | 1/1968 |
| JP | 50-6823 A | 1/1975 |
| JP | 3979494 B2 | 7/2007 |

OTHER PUBLICATIONS

Supplementary European Search Report issued in corresponding application 11845580.7, completed Jul. 16, 2014 and mailed Jul. 22, 2014.

(Continued)

*Primary Examiner* — Joseph S Del Sole
*Assistant Examiner* — Russell Kemmerle, III
(74) *Attorney, Agent, or Firm* — Griffin & Szipl, P.C.

(57) ABSTRACT

To provide an inorganic fiber that suppresses adverse effects on a human body and living environments, exhibits high biosolubility, and also exhibits excellent heat resistance as a constituent material for a filter material, a sealing material, or the like. The inorganic fiber comprises 30 mass % or more and less than 81 mass % of $Al_2O_3$, more than 19 mass % and 65 mass % or less of MgO and 0 mass % to 40 mass % of $SiO_2$, wherein the total content of $Al_2O_3$, MgO and $SiO_2$ relative to the entire fiber is 98 mass % or more.

9 Claims, 1 Drawing Sheet

(51) Int. Cl.
*C04B 35/195* (2006.01)
*C04B 35/20* (2006.01)
*C04B 35/44* (2006.01)

(52) U.S. Cl.
CPC .... *C04B 35/62245* (2013.01); *C04B 35/62263* (2013.01); *C04B 2235/3206* (2013.01); *C04B 2235/3218* (2013.01); *C04B 2235/442* (2013.01); *C04B 2235/449* (2013.01); *C04B 2235/5264* (2013.01)

(56) References Cited

U.S. PATENT DOCUMENTS

| | | | |
|---|---|---|---|
| 4,101,615 A * | 7/1978 | Horikiri et al. | 264/627 |
| 5,041,512 A * | 8/1991 | Tebbe | 528/9 |
| 5,424,260 A | 6/1995 | Yerushalmi et al. | |
| 5,650,007 A | 7/1997 | Kawakami et al. | |
| 8,163,377 B2 * | 4/2012 | Wainwright et al. | 428/296.7 |
| 2010/0009187 A1 * | 1/2010 | Roesch et al. | 428/401 |

OTHER PUBLICATIONS

English translation of the International Preliminary Report on Patentability issued in corresponding application PCT/JP2011/077612, issued Jun. 4, 2013 and mailed Jun. 13, 2013.

International Search Report issued in corresponding application PCT/JP2011/077612, completed Feb. 23, 2012 and mailed Mar. 6, 2012.

* cited by examiner

INORGANIC FIBER AND METHOD FOR MANUFACTURING THE SAME

This is a National Phase Application in the United States of International Patent Application No. PCT/JP2011/077612 filed Nov. 30, 2011, which claims priority on Japanese Patent Application No. 2010-266381, filed Nov. 30, 2010. The entire disclosures of the above patent applications are hereby incorporated by reference.

TECHNICAL FIELD

The invention relates to inorganic fibers and a method for producing the same.

BACKGROUND ART

An inorganic fiber is composed mainly of a fiber of an inorganic compound, and is expected to be used as a material constituting an insulating material or a refractory material or the like. In particular, an inorganic fiber having an average fiber diameter of 1 μm or less is expected to be used as a filter material or a sealing material.

As the inorganic fiber having a small fiber diameter, asbestos has conventionally been known. Since asbestos has a small fiber diameter and has a high chemical resistance to body fluids, it reaches the inside of a lung by breathing and exerts a long-term effect on the cells in the alveolus, and as a result, adversely affects a human body. Further, as for an inorganic fiber other than asbestos, an inorganic fiber composed mainly of $SiO_2$ having excellent heat resistance is thought to adversely affect a human body if $SiO_2$ is crystallized at high temperatures to generate cristobalite.

Therefore, as an inorganic fiber having biosolubility and having low chemical resistance to body fluids, an inorganic fiber composed of 65 wt % to 99 wt % of $Al_2O_3$ and 1 wt % to 35 wt % of $SiO_2$ obtained by a process in which a spinning solution comprising a solution that contains aluminum oxychloride, colloidal silica and a thickener is withdrawn from a plurality of spinning nozzles to form a fiber precursor, followed by quick heating and rapid quenching (Patent Document 1 (see Japanese Patent No. 3979494) is proposed.

RELATED ART DOCUMENTS

Patent Documents

Patent Document 1: Japanese Patent No. 3979494

DISCLOSURE OF THE INVENTION

Problems to be Solved by the Invention

However, as a result of intensive studies made by the inventors, it has been found that the inorganic fiber disclosed in Patent Document 1 does not necessarily exhibit biosolubility. Further, depending on the application of an inorganic fiber, an inorganic fiber having a higher biosoluble speed than the inorganic fiber in Patent Document 1 has been required.

Under such circumstances, a first object of the invention is to provide inorganic fibers having a high biosoluble speed and a high heat resistance, and a second object of the invention is to provide a method for producing the inorganic fibers easily.

Means for Solving the Subject

In order to solve the above-mentioned problem, the inventors made intensive studies. As a result, the inventors have found that, the first object can be attained by an Inorganic fiber comprising 30 mass % or more and less than 81 mass % of $Al_2O_3$, more than 19 mass % and 65 mass % or less of MgO and 0 mass % to 40 mass % of $SiO_2$, wherein the total content of $Al_2O_3$, MgO and $SiO_2$ relative to the entire fiber is 98 mass % or more. Further, the inventors have found that the second object can be attained by dissolving in an aqueous medium, in terms of a metal oxide, 30 mass % or more and less than 81 mass % of the water-soluble basic acid aluminum, more than 19 mass % and 65 mass % or less of a water-soluble magnesium compound and 0 mass % to 40 mass % of the water-soluble or a water-dispersible silicon compound, relative to the total amount of metal oxides to form an aqueous raw material solution for spinning; spinning the aqueous raw material solution to obtain a crude inorganic fiber; and firing the crude inorganic fiber.

The invention has been made based on this finding.

That is, the invention provides:

(1) An Inorganic fiber comprising 30 mass % or more and less than 81 mass % of $Al_2O_3$, more than 19 mass % and 65 mass % or less of MgO and 0 mass % to 40 mass % of $SiO_2$, wherein the total content of $Al_2O_3$, MgO and $SiO_2$ relative to the entire fiber is 98 mass % or more.

(2) The inorganic fiber according to (1), wherein the inorganic fiber is obtained by preparing a water-soluble basic acid aluminum as a raw material of $Al_2O_3$, an aqueous magnesium compound as a raw material of MgO and a water-soluble or water-dispersible silicon compound as a raw material of $SiO_2$;

dissolving in an aqueous medium, in terms of a metal oxide, 30 mass % or more and less than 81 mass % of the water-soluble basic acid aluminum, more than 19 mass % and 65 mass % or less of a water-soluble magnesium compound and 0 mass % to 40 mass % of the water-soluble or water-dispersible silicon compound, relative to the total amount of raw materials, to form an aqueous raw material solution for spinning;

spinning the aqueous raw material solution to obtain a crude inorganic fiber; and firing the crude inorganic fiber.

(3) The inorganic fiber according to (2), wherein the water-soluble basic acid aluminum is one or more selected from compounds represented by the following composition formula (I):

$$Al(OH)_xY_z \qquad (I)$$

wherein X is a positive number more than 0 and less than 3; Y is any one selected from a Cl atom, an $NO_3$ group, an $SO_4$ group and a RCOO group; Z is 3−X when Y is a Cl atom, an $NO_3$ group or an RCOO group, and (3−X)/2 when Y is an $SO_4$ group; and R is a hydrogen atom or a hydrocarbon group or hydroxyl group-containing hydrocarbon group having 1 to 10 carbon atoms, and when plural RCOO groups are present, the Rs may be the same or different.

(4) A method for producing the inorganic fiber according to (1), comprising:

preparing a water-soluble basic acid aluminum is used as a raw material of $Al_2O_3$, a water-soluble magnesium compound as a raw material of MgO and a water-soluble or water-dispersible silicon compound as a raw material of $SiO_2$;

dissolving in an aqueous medium, in terms of a metal oxide, 30 mass % or more and less than 81 mass % of water-soluble basic acid aluminum, more than 19 mass % and 65 mass % or less of a water-soluble magnesium compound and 0 mass % to 40 mass % of a water-soluble or a water-dispersible silicon compound, relative to the total amount of raw materials, to form an aqueous raw material solution for spinning;

spinning the aqueous raw material solution to obtain a crude inorganic fiber; and firing the crude inorganic fiber.

(5) The method for producing the inorganic fiber according to (4), wherein the water-soluble basic acid aluminum is one or more selected from compounds represented by the following composition formula (I):

$$Al(OH)_xY_z \qquad (I)$$

wherein X is a positive number more than 0 and less than 3; Y is any one selected from a Cl atom, an $NO_3$ group, an $SO_4$ group and a RCOO group; Z is 3–X when Y is a Cl atom, an $NO_3$ group or an RCOO group, and (3–X)/2 when Y is an $SO_4$ group; and R is a hydrogen atom or a hydrocarbon group or hydroxyl group-containing hydrocarbon group having 1 to 10 carbon atoms, and when plural RCOO groups are present, the Rs may be the same or different.

(6) The method for producing the inorganic fiber according to (4) or (5), wherein the firing is conducted at a temperature of 500° C. or higher and lower than a liquid phase generation temperature.

Advantageous Effects of the Invention

According to the invention, it is possible to provide an inorganic fiber having a high biosoluble speed and an excellent heat resistance, as well as to provide a method for producing the inorganic fiber easily.

MODE FOR CARRYING OUT THE INVENTION

First, an explanation will be made on the inorganic fiber of the invention.

The inorganic fiber of the invention comprises 30 mass % or more and less than 81 mass % of $Al_2O_3$, more than 19 mass % and 65 mass % or less of MgO and 0 mass % to 40 mass % of $SiO_2$, wherein the total content of $Al_2O_3$, MgO and $SiO_2$ relative to the entire fiber is 98 mass % or more.

The inorganic fiber of the invention comprises 30 mass % or more and less than 81 mass % of $Al_2O_3$, preferably 33 mass % to 78 mass % of $Al_2O_3$. If the content of $Al_2O_3$ is in the above-mentioned range, a desired heat resistance tends to be obtained easily.

The inorganic fiber of the invention comprises more than 19 mass % and 65 mass % or less of MgO. It is preferred that the inorganic fiber comprise 22 mass % to 62 mass % of MgO. If the content of MgO is within the above-mentioned range, desired biosolubility tends to be obtained easily.

The inorganic fiber of the invention comprises $SiO_2$ in an amount of 0 mass % to 40 mass %. It is more preferred that the inorganic fiber comprise $SiO_2$ in an amount of 0 mass % to 37 mass %. The inorganic fiber of the invention can exhibit desired biosolubiliy even if no $SiO_2$ is contained. However, if the content of $SiO_2$ is in the above-mentioned range, desired biosolubility can be exhibited more easily.

In respect of biosolubility, it is preferred that the composition of the inorganic fiber be in a prescribed range according to the diameter of the fiber. If the fiber diameter is large, a long period of time is required until the fiber is dissolved and disappeared in a living body. Therefore, it is preferred that an inorganic fiber having a large fiber diameter have a composition which enables a dissolution speed to be high.

In the inorganic fiber of the invention, the amount ratio of the total of $Al_2O_3$, MgO and $SiO_2$ is 98 mass % or more, more preferably 99 mass % or more of the entire fiber. If the total content of $Al_2O_3$, MgO and $SiO_2$ relative to the entire fiber is 98 mass % or more, desired biosolubility and heat resistance can be obtained.

The inorganic fiber of the invention can comprise less than 2 mass % of an inevitable component. Here, the "inevitable component" means an impurity component which is inevitably mixed in when preparing the inorganic fiber.

The inorganic fiber of the invention can exhibit desired biosolubility and heat resistance when it comprises 30 mass % or more and less than 81 mass % of $Al_2O_3$, more than 19 mass % and 65 mass % or less of MgO and 0 mass % to 40 mass % of $SiO_2$, and the total content of $Al_2O_3$, MgO and $SiO_2$ relative to the entire fiber is 98 mass % or more.

In the inorganic fiber of the invention, the content (mass %) of each component means a value obtained by the following method. Specifically, a method in which a part is taken out from an aqueous raw material spinning solution (mentioned later) which was used when preparing the fiber, and dried. Subsequently, the part was fired at 1000° C. for 2 hours to obtain powder. This powder was used as a measurement sample, and a measurement is conducted by means of an X-ray fluorescence spectrometer (RIX2000, manufactured by Rigaku Corporation). The resulting inorganic fibers may contain balancing components. In such a case, a compensation calculation is conducted such that the total amount of metal oxides excluding the balancing components becomes 100 mass %.

It is preferred that the inorganic fiber of the invention have the above-mentioned composition, and be obtained by preparing water-soluble basic acid aluminum as a raw material of $Al_2O_3$, an aqueous magnesium compound as a raw material of MgO and a water-soluble or water-dispersible silicon compound as a raw material of $SiO_2$; dissolving in an aqueous medium, in terms of a metal oxide, 30 mass % or more and less than 81 mass % of the water-soluble basic acid aluminum, more than 19 mass % and 65 mass % or less of a water-soluble magnesium compound and 0 mass % to 40 mass % of the water-soluble or water-dispersible silicon compound, relative to the total amount of raw materials, to form an aqueous raw material solution for spinning; spinning the aqueous raw material solution to obtain a crude inorganic fiber; and firing the crude inorganic fiber.

The above-mentioned aqueous raw material solution for spinning contains, as a metal oxide raw material, water-soluble basic acid aluminum, a water-soluble magnesium compound and, if desired, a water-soluble or a water-dispersible silicon compound. It is preferred that the inorganic fiber comprise 30 mass % or more and less than 81 mass % of aqueous basic acid aluminum in the total metal oxide raw material, in terms of a metal oxide. It is more preferred that the inorganic fiber comprise 33 mass % to 78 mass % of water-soluble basic acid aluminum.

The concentration of the water-soluble basic acid aluminum in the above-mentioned aqueous raw material solution for spinning is preferably 0.75 mass % to 19.5 mass %, more preferably 1.5 mass % to 13 mass %, in terms of a metal oxide.

The aqueous raw material solution for spinning preferably contains more than 19 mass % and 65 mass % or less of a water-soluble magnesium compound in the total metal oxide raw material, in terms of a metal oxide. It is more preferred that the aqueous raw material solution for spinning contain 22 mass % to 62 mass % of a water-soluble magnesium compound.

The concentration of the water-soluble magnesium compound in the aqueous raw material solution for spinning is, in terms of a metal oxide, preferably 1 mass % to 18 mass %, with 1.5 mass % to 12 mass % being more preferable.

As for the aqueous raw material solution for spinning, in terms of a metal oxide, it is preferred that it contain 0 mass % to 40 mass % of a water-soluble or water-dispersible silicon compound in the total metal oxide raw material. It is more preferred that it contain 0 mass % to 37 mass % of a water-soluble or water-dispersible silicon compound.

The concentration of the water-soluble or water-dispersible silicon compound in the aqueous raw material solution for spinning is preferably 0 mass % to 10.5 mass %, with 0 mass % to 7 mass % being more preferable.

In this application document, "in terms of a metal oxide" of the water-soluble basic acid aluminum means "in terms of $Al_2O_3$". "In terms of a metal oxide" of the water-soluble magnesium compound means "in terms of MgO". "In term of a metal oxide" of a water-soluble or a water-dispersible silicon compound means "in terms of $SiO_2$".

In the inorganic fibers of the invention, it is preferred that the above-mentioned water-soluble basic acid aluminum be one or more selected from compounds represented by the following formula (I):

$$Al(OH)_xY_z \qquad (I)$$

wherein X is a positive integer of more than 0 and less than 3, Y is one selected from a Cl atom, an $NO_3$ group, an $SO_4$ group and an RCOO group; Z is 3–X when Y is a Cl atom, an $NO_3$ group and an RCOO group, (3–X)/2 when Y is an $SO_4$ group and R is a hydrogen atom or a hydrocarbon group or hydroxyl group-containing hydrocarbon group having 1 to 10 carbon atoms. If a plurality of RCOO groups are present, the Rs may be the same or different.

The details of each material constituting the aqueous raw material solution for spinning, the spinning method, the firing conditions or the like are as mentioned later.

The inorganic fiber of the invention is preferably obtained by spinning by the electrospinning method mentioned later.

The inorganic fiber of the invention can exhibit biosolubility even if it has an average fiber diameter of less than 4 µm. The average fiber diameter of the inorganic fiber is preferably 3 µm or less, more preferably 1 µm or less, with 0.5 µm or less being further preferable.

If the average fiber diameter of the inorganic fiber is 1 µm or less, it can be preferably used as a material constituting a filter material and a sealing material. The inorganic fiber having an average fiber diameter of 1 µm or less can be produced by adjusting the atmosphere at the time of electrospinning by the static spinning method mentioned later by adjusting the applied voltage or by adjusting the concentration or viscosity of the aqueous raw material solution for spinning, or the like.

The inorganic fiber of the invention is more preferably an inorganic fiber which has a dissolution speed of 20 ng/cm²·h or more, more preferably 40 ng/cm²·h or more 0 to 24 hours after the start of a test or 24 to 48 hours after the start of a test, when evaluated by the method of evaluating biosolubility, mentioned later. Although no specific restrictions are imposed on the dissolution speed, the dissolution speed is normally about 5400 ng/cm²·h.

The inorganic fiber of the invention has a high dissolution speed in a living body and has excellent biosolubility. Even if the inorganic fiber has a small average fiber diameter, it exerts only small effects on living environments. Further, according to the production method mentioned later, it can have a reduced diameter easily. Therefore, it is possible to use a thin fibrous product having an average fiber diameter of 1 µm or less in various industrial fields as a constituting material for a filter material and a sealing material.

In this application document, the average fiber diameter of inorganic fibers means an average value calculated by a method in which the widths of fibers at 30 to 122 locations arbitrary selected from a photograph (magnification: ×2000 to 5000) taken by a scanning electron microscope (JSM-5800LV, manufactured by JEOL, Ltd.) are measured and the average value of these is obtained.

It is preferred that the inorganic fiber of the invention have a melting point of 1300° C. or more, more preferably 1350° C. or more. Since the inorganic fiber of the invention has an excellent heat resistance, i.e. has a melting point of 1350° C. or more, it can preferably be used as a filter material, a sealing material, or the like.

Various methods can be given as a method for producing the inorganic fiber of the invention. Specifically, a method in which a raw material solution for spinning having a desired composition is subjected to dry spinning; a melt continuation spinning method in which a molten product having a desired composition is drawn from a spinning nozzle, cooled, and spinning is conducted while winding; a spinner method (external centrifugation method) in which a molten product having a desired composition is allowed to collide with a high-speed rotating body, and the molten product is allowed to be fibrous by the centrifugal force; an internal centrifugation method in which a molten product having a desired composition is discharged from a rotating body, and the molten product is then allowed to be fibrous; and a melt blow method in which a molten product having a desired composition is allowed to be fibrous by compressed air. As the above-mentioned dry spinning method, a dry continuous spinning method in which a raw material solution for spinning having a desired composition is discharged from a nozzle, and the discharged product is dried while winding by a winder and is elongated; a method in which a raw material solution for spinning having a desired composition is centrifuged in the stream of air and dried to obtain un-continuous fibers; or the electrostatic spinning method mentioned later.

In the dry spinning method, it is preferable to adjust adequately the viscosity of the raw material solution for spinning. The viscosity of the raw material solution for spinning can be adjusted by changing the amount of a spinning auxiliary to be added or by concentration by heating or pressure reduction or by dilution by addition of water.

For example, if a raw material solution for spinning is spun by the continuous spinning method in order to obtain a fiber having an average fiber diameter of several µm to several tens µm, it is preferred that the viscosity thereof be about several tens Pa·s to several hundreds Pa·s, with 60 Pa·s to 200 Pa·s being more preferable. If the viscosity is less than several tens Pa·s, the spinning solution extruded from a nozzle is likely to suffer capillary breakage by the surface tension, and as a result, spinning becomes difficult. Further, if the above-mentioned viscosity exceeds several hundreds Pa·s, aggregation-breakage occurs when elongating the fiber, whereby the fiber diameter is difficult to be reduced. At the same time, when a spinning solution is extruded from a nozzle, a high pressure is required to make a fiber production apparatus to be large.

For example, if spinning is conducted in order to obtain a fiber having an average fiber diameter of several µm by the rotating centrifugal circular disc method in which a raw material solution for spinning is ejected by centrifugation from a large number of holes and elongated, followed by spinning or by the blowing method in which a spinning solution is elongated by blowing air, the viscosity of the raw material solution for spinning is preferably several Pa·s to several tens Pa·s. If the above-mentioned viscosity is less than several Pa·s, problems that the raw material solution for spinning is scattered in the form of liquid droplets without becoming fibrous or even if the solution becomes fibrous, if the fiber is broken when the spinning solution is elongated, a large amount of circular particles called a shot is generated. If the viscosity is too large, elongation by centrifugal force or blowing becomes impossible, thereby making production of fibers impossible.

By subjecting the crude inorganic fiber obtained by the above-mentioned dry spinning method to a firing treatment appropriately, it is possible to obtain desired inorganic fiber by causing the organic matters in the crude inorganic fiber to disappear. As for the firing conditions or the like, an explanation will be made later.

Of the above-mentioned methods for producing an inorganic fiber, the method for producing by the dry spinning method, in particular, the method for producing by using the electrospinning method is preferable since it can produce an intended inorganic fiber easily at a low cost.

Then, an explanation will be made on the method for producing an inorganic fiber of the invention.

The method for producing an inorganic fiber of the invention is the method for producing an inorganic fiber of the invention as mentioned above, in which water-soluble basic acid aluminum is used as a raw material of $Al_2O_3$, an water-soluble magnesium compound is used as a raw material of MgO and a water-soluble or water-dispersible silicon compound is used as a raw material of $SiO_2$, and the inorganic fiber is prepared by a method comprising preparing an aqueous raw material solution for spinning by dissolving in an aqueous medium, in terms of a metal oxide, 30 mass % or more and less than 81 mass % of a water-soluble basic acid aluminum, more than 19 mass % and 65 mass % or less of a water-soluble magnesium compound and 0 mass % to 40 mass % of a water-soluble or water-dispersible silicon compound, relative to the total amount of raw materials, spinning the aqueous raw material solution for spinning to obtain a crude inorganic fiber, and firing the crude inorganic fiber.

In the production method of the invention, as the water-soluble basic acid aluminum used as the raw material, a compound represented by the following formula (I) can be given.

$$Al(OH)_xY_z \qquad (I)$$

wherein X is a positive number more than 0 and less than 3; Y is any one selected from a Cl atom, an $NO_3$ group, an $SO_4$ group and an RCOO group; Z is 3−X when Y is a Cl atom, an $NO_3$ group or an RCOO group and (3−X)/2 when Y is an $SO_4$ group; and R is a hydrogen atom or a hydrocarbon group or hydroxyl group-containing hydrocarbon group having 1 to 10 carbon atoms, and when plural RCOO groups are present, the Rs may be the same or different.

The basic acid aluminum as given above is an octahedral coordinated aluminum polynuclear complex (non-ionic polymer) in which cross linking is conducted by a hydroxyl group, and can take the form of a dimer or an oligomer.

In the basic acid aluminum represented by the compositional formula (I), it is preferred that X be a positive number of 1 or more and 3 or less, with a positive number of 1 or more and 2.5 or less being more preferable.

In the compositional formula (I), X can be calculated from the compositional ratio of acids or the like added when the basic acid aluminum is synthesized.

As for the basic acid aluminum represented by the compositional formula (I), basic aluminum carboxylate ($Al(OH)_x(RCOO)_{3-x}$) can preferably be used since it is possible to suppress generation of chloride or nitric acid, which exerts great environmental burden when firing (mentioned later).

If the basic acid aluminum shown by the compositional formula (I) is basic aluminum carboxylate, the R constituting the RCOO group is a hydrogen atom or a hydrocarbon group or hydroxyl group-containing hydrocarbon group having 1 to 10 carbon atoms.

If R is a hydrocarbon group or hydroxyl group-containing hydrocarbon group, the number of carbon atoms is 1 to 10, with 1 to 5 being preferable. If the number of carbon atoms exceeds 5, the basic acid aluminum represented by the formula (I) hardly exhibits water solubility. Further, if R is a hydrocarbon group or hydroxyl group-containing hydrocarbon group, the hydrocarbon group part may be linear or branched. The hydrocarbon group part may be a saturated hydrocarbon group or an unsaturated hydrocarbon group.

If R is a hydrocarbon group, as examples of the hydrocarbon group, an alkyl group, an alkenyl group, a cycloalkyl group, an alkylcycloalkyl group or the like can be given.

Specifically, an alkyl group such as a methyl group, an ethyl group, a propyl group, and a butyl group (if these alkyl groups can be branched, the alkyl group may be linear or branched); an alkenyl group such as a propenyl group and a butenyl group (if these alkenyl groups can be branched, the alkenyl group may be linear or branched, and the position of a double bond may be arbitral); a cycloalkyl group such as a cyclopropyl group and a cyclobutyl group; an alkylcycloalkyl group such as a methylcyclopropyl group and a methylcyclobutyl group (the substitution position of the alkyl group to the cycloalkyl group is arbitral) or the like can be given.

If R is a hydroxyl group-containing hydrocarbon group, as the hydroxyl group-containing hydrocarbon group, a hydroxylalkyl group, a hydroxyalkenyl group, a hydroxycycloalkyl group or the like can be given.

Specifically, a hydroxyalkyl group such as a hydroxylmethyl group, a hydroxyethyl group, a hydroxypropyl group and a hydroxybutyl group (if these hydroxyalkyl groups can be branched, the alkyl groups constituting the hydroxyalkly group may be linear or branched), a hydroxyalkenyl group such as a hydroxybutenyl group (the alkenyl group constituting the hydroxyalkenyl group may be linear or branched, and the position of a double bond may be arbitral); a hydroxycycloalkyl group such as a hydroxycyclopropyl group and a hydroxycyclobutyl group (the substitution position of the hydroxyl group or the alkyl group to a cycloalkyl group is arbitral) or the like can be given.

In respect of stability in water, as the RCOO group, a reaction residue of carboxylic acid selected from formic acid, acetic acid and lactic acid (a HCOO group, a $CH_3COO$ group, a $CH_3CH(OH)COO$ group) is preferable.

In the production method of the invention, as the raw material for magnesia, a water-soluble magnesium compound is used. As the magnesium compound, no specific restrictions are imposed as long as it is water-soluble and can be dissolved in a desired amount in the aqueous raw material solution for spinning, which will be mentioned later. For example, carbonates, nitrates, sulfates, acetates, hydroxides, chlorides, fluorides, borates, phosphates or the like can be given.

Of these magnesium compounds, in the production method of the invention, if basic aluminum carboxylate is used as the aluminum compound to be dissolved in the aqueous raw material solution for spinning, it is preferred that a magnesium compound be also a carboxylate. In respect of easiness of solubility in an aqueous raw material solution for spinning or easiness in obtaining materials, magnesium acetate tetrahydrate is more preferable.

In the production method of the invention, as the silica raw material, a water-soluble or a water-dispersible silicon compound is used. As the silicon compound, no specific restrictions are imposed as long as it is dissolved or dispersed in an aqueous raw material solution for spinning. For example, as the water-soluble silicon compound, a water-soluble silicate, a water-soluble silicon alkoxide (tetramethoxysilane, tetraethoxysilane, tetrapropoxysilane or the like) can be given. As the water-dispersible silicon compound, silica sol (colloidal silica) or the like can be given. Of these silicon compounds, silica sol (colloidal silica) is preferable in respect of viscosity stability or the like of the aqueous raw material solution for spinning.

As the silica sol, one obtained by dispersing silica having a particle size of 4 to 100 nm in a medium having a solid content of 5 mass % to 30 mass % is preferable. Silica sol can be produced by the sol-gel method in which sol is produced from alkoxysilane or the sodium silicate method in which silica sol is produced from sodium silicate.

In the production method of the inorganic fiber of the invention, if need arises, a spinning auxiliary may further be used. As the spinning auxiliary, no specific restrictions are imposed on the spinning auxiliary as long as it can prepare a desired inorganic fiber. However, in respect of easiness in handling or solubility, it is preferred that the spinning auxiliary be a water-soluble organic polymer. For example, polyethylene oxide, polypropylene oxide, polyvinyl alcohol, polyvinyl ether, polyvinyl ester, polyacrylic acid ester and a copolymer thereof can be given. Of these, polyacrylic acid ester is preferable.

In the production method of the inorganic fiber of the invention, by adding a spinning auxiliary, variations in fiber diameter are suppressed, whereby stable spinning can be realized. Further, the strength of unfired fibers after the electrostatic spinning is improved, thereby leading to excellent handling properties.

In the production method of the invention, water-soluble basic acid aluminum, a water-soluble magnesium compound, a water-soluble or water-dispersible silicon compound, and if necessary, a spinning auxiliary are dissolved in an aqueous medium, an aqueous raw material solution for spinning is prepared.

As the aqueous medium, water is preferable. In order to improve the stability of a solution or in order to conduct spinning stably, a medium which is composed mainly of water and containing other mediums which are soluble in water, for example, alcohols, ketones, amines, amides, carboxylic acids or the like may be used. Further, one obtained by adding an organic salt such as ammonium chloride to these mediums may be used.

The aqueous raw material solution for spinning contains, as the metal oxide raw material, water-soluble basic acid aluminum, a water-soluble magnesium compound and, if desired, a water-soluble or water-dispersible silicon compound. In terms of a metal oxide, it is preferred that it comprise 30 mass % or more and less than 81 mass % of water-soluble basic acid aluminum, and it is more preferred that it comprise 33 mass % to 78 mass % of water-soluble basic acid aluminum.

The concentration of the water-soluble basic acid aluminum in the aqueous raw material solution for spinning is preferably 0.75 mass % to 19.5 mass % in terms of a metal oxide, with 1.5 mass % to 13 mass % being more preferable.

The solid content (concentration of solid matters in the raw material) of the water-soluble basic acid aluminum in the aqueous raw material solution for spinning is preferably 2 mass % to 59 mass %, with 5 mass % to 44 mass % being more preferable.

If the amount ratio of the water-soluble basic acid aluminum is in the above range, it becomes easy to obtain an inorganic fiber having desired heat resistance.

Further, in terms of a metal oxide, it is preferred that the aqueous raw material solution for spinning comprise more than 19 mass % and 65 mass % or less, more preferably 22 mass % to 62 mass %, of a water-soluble magnesium compound in the total metal oxide raw material.

The concentration of the water-soluble magnesium compound in the aqueous raw material solution for spinning is preferably 1 mass % to 18 mass %, more preferably 1.5 mass % to 12 mass %, in terms of a metal oxide in the total metal oxide raw material.

The solid content (concentration of solid matters in the raw material) of the water-soluble magnesium compound in the aqueous raw material solution for spinning is preferably 4 mass % to 79 mass %, with 8 mass % to 60 mass % being more preferable.

If the amount ratio of the water-soluble magnesium compound is in the above-mentioned range, an inorganic fiber having desired biosolubility tends to be obtained easily.

It is preferred that the aqueous raw material solution for spinning comprise 0 mass % to 40 mass %, more preferably 0 mass % to 37 mass %, of a water-soluble or water-dispersible silicon compound in the total metal oxide raw material, in terms of a metal oxide in the above-mentioned aqueous raw material solution for spinning.

The concentration of a water-soluble or water-dispersible silicon compound in the aqueous raw material solution for spinning is preferably 0 mass % to 10.5 mass %, more preferably 0 mass % to 7 mass %, in terms of a metal oxide.

The solid content (concentration of solid matters in the raw material) of a water-soluble or water-dispersible silicon compound is preferably 0 mass % to 14 mass %, more preferably 0 mass % to 10 mass %.

In the production method of the invention, it is possible to obtain an inorganic fiber having a desired biosolubility without using a water-soluble or water-dispersible silicon compound. However, by using a water-soluble or water-dispersible silicon compound, desired biosolubility is likely to be obtained more easily.

As mentioned above, in this application document, the mass ratio (mass %) of each raw material metal oxide in terms of a metal oxide means the mass ratio (mass %) of water-soluble basic acid aluminum in terms of $Al_2O_3$, a water-soluble magnesium compound in terms of MgO and a water-soluble or water-dispersible silicon compound in terms of $SiO_2$.

When the aqueous raw material solution for spinning contains a spinning auxiliary, the concentration of the spinning auxiliary in the aqueous raw material solution for spinning is preferably 0.1 mass % to 10 mass %, more preferably 0.1 mass % to 8 mass %. It is preferred that the amount of the spinning auxiliary be as small as possible in order to allow the fiber to be dense after firing and to retain the strength. However, if the amount of the spinning auxiliary is small, the fiber morphology may not be stable at the time of production. Therefore, it is preferable to adjust the amount to be added, if necessary.

No particular restrictions are imposed on the method for producing the aqueous raw material solution for spinning. For example, it may be produced by mixing an aqueous medium, water-soluble basic acid aluminum, a water-soluble magnesium compound, a water-soluble or water-dispersible silicon compound, and if necessary, a spinning auxiliary or other arbitral components such that each component is dissolved at a desired concentration. Alternatively, it may be produced by mixing an aqueous solution of water-soluble basic acid aluminum, an aqueous solution of a water-soluble magnesium compound, an aqueous solution of a water-soluble or water-dispersible silicon compound and, if necessary, an aqueous solution of a spinning auxiliary or other arbitral components such that each component is dissolved at a desired concentration.

The viscosity of the aqueous raw material solution for spinning is preferably about 0.01 to 5.0 Pa·s, more preferably about 0.05 to 3.0 Pa·s. If the viscosity of the aqueous raw material solution for spinning is less than 0.01 Pa·s, the aqueous raw material solution for spinning is not fibrous when spinning, thereby generating spherical particles. If the viscosity of the aqueous raw material solution for spinning exceeds 5.0 Pa·s, a treatment for allowing it to be fibrous becomes difficult. The viscosity of the aqueous raw material solution for spinning can be adjusted by adjusting the amount of a spinning auxiliary or by conducting a concentration operation by a heat treatment or a depressurization treatment appropriately.

In this application document, the viscosity of the aqueous raw material solution for spinning means a value measured by the method explained below. The viscosity is measured by means of a rheometer (Physica MCR301, manufactured by AntonPaar, Ltd.). The viscosity of the spinning solution in this application is a shearing viscosity when the shearing speed was $10\ s^{-1}$. The viscosity was measured while keeping the liquid temperature of the spinning solution at 25° C. Hereinbelow, the viscosity measured under the above-mentioned conditions is taken as the viscosity in this application document.

In the production method of the invention, no particular restrictions are imposed on the method for spinning the above-mentioned aqueous raw material solution for spinning, and various methods as mentioned above can be used. It is preferred that the aqueous raw material solution for spinning be subjected to spinning by the electrostatic spinning method to obtain a crude inorganic fiber.

The electrostatic spinning method is a method in which a voltage is applied to the aqueous raw material solution for spinning containing a fiber-forming compound, and the aqueous raw material solution for spinning is discharged utilizing electrostatic repulsion and is allowed to be fibrous.

As the method for discharging the aqueous raw material solution for spinning to the electrostatic field to which a voltage has been applied, an arbitral method can be used. For example, a method in which, in the state where the aqueous raw material solution for spinning is supplied to a nozzle, the nozzle is placed at an appropriate place in the electrostatic field, and the aqueous raw material solution for spinning is pulled out from the nozzle by the electric field and is allowed to be fibrous can be given.

The specific embodiment of the spinning by the electrospinning method according to the invention will be explained with reference to FIG. 1.

Figure 1:
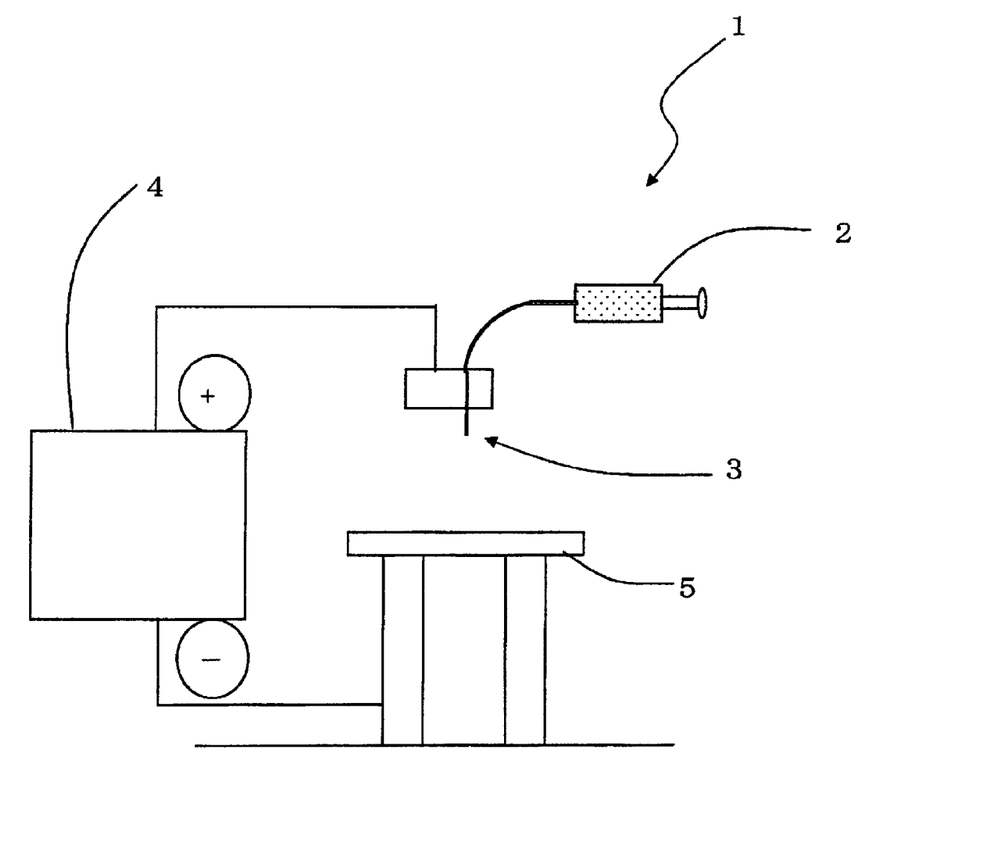
FIG. 1 is a view showing one example of a spinning apparatus for use in electrospinning.

FIG. 1 is a view showing one example of a spinning apparatus to be used for electrospinning. In FIG. 1, a spinning apparatus 1 is formed of a syringe 2, a nozzle 3, a high-voltage generating apparatus 4 and a sample collection table 5.

In the spinning apparatus 1 shown in FIG. 1, the aqueous raw material solution for spinning is supplied to the front end part of the nozzle 3 after being filled in the syringe 2. The high-voltage generating apparatus 4 is electrically connected to a conductive fixing part and the conductive sample collection table 5 which are respectively provided around the nozzle 3. By applying a voltage to the nozzle 3 through the fixing part provided around the nozzle 3, the aqueous raw material solution for spinning is ejected from the front end of the nozzle 3, and the solution is allowed to be fibrous to obtain a crude inorganic fiber. The resulting crude inorganic fiber is collected on the sample collection table 5 as a counter electrode.

When the aqueous raw material solution for spinning is supplied to the electrostatic field from the nozzle 2, it is possible to provide a plurality of nozzles 2 and to arrange the nozzles 2 in parallel to increase the production speed of a fibrous material.

In the production method of the invention, as for the voltage to be applied at the time of electrospinning, taking into consideration conditions such as the distance between the front end of the nozzle and the counter electrode (distance between the electrodes), the viscosity of the aqueous raw material solution for spinning, the concentration of the aqueous raw material solution for spinning or the like, the voltage is preferably 1 to 100 kV, with 3 to 30 kV being more preferable.

The distance between electrodes depends on the electric charge amount, the nozzle dimension, the ejected amount of an aqueous raw material solution for spinning from the nozzle, the concentration of the aqueous raw material solution for spinning or the like. However, the distance is preferably 20 to 500 mm, more preferably 50 to 300 mm, with 100 to 200 mm being further preferable.

It is preferred that the crude inorganic fiber obtained by electrostatic spinning have an average fiber diameter of 10 nm to 2000 nm, more preferably 50 nm to 1000 nm.

In this application document, the average fiber diameter of the crude inorganic fiber means an average value by a method in which, from a photograph (magnification ×2000 to 5000), taken by a scanning electron microscope (JSM-5800LV, manufactured by JEOL, Ltd.), 30 to 122 parts are arbitrarily selected, the widths of the fibers are measured, and calculation is conducted from the widths thus measured.

In the production method of the invention, subsequently, the crude inorganic fiber obtained by the electrospinning method is fired.

The firing temperature is preferably 500° C. or more and less than the liquid phase generation temperature. Specifically, the firing temperature is preferably 500° C. or more and 1300° C. or less, at which no liquid phase is generated.

If the firing temperature is less than 500° C., organic components such as organic polymers used as the spinning auxiliary may remain in the inorganic fiber. If the firing temperature exceeds 1300° C., the inorganic fiber obtained as a result of the growth of crystal particles may be significantly brittle or the inorganic fiber may react with the hearth as a result of the generation of a liquid phase.

It is desired that the above-mentioned firing temperature be in a prescribed range depending on the composition of the inorganic fiber to be obtained. In the production method of the invention, by controlling the firing temperature in a desirable range, it is possible to impart the resulting inorganic fiber with more excellent biosolubility.

Firing can be conducted by means of a known electric furnace or the like. In order to decompose the organic compounds used as the spinning auxiliary, the atmosphere at the time of firing be an atmospheric air or an oxidizing atmosphere. If the decomposition performance of the remaining organic product is not required to be taken into consideration, the firing may be conducted in the nitrogen atmosphere.

As mentioned above, in the production method of the invention, the inorganic fiber of the invention can be produced easily at a low cost.

EXAMPLES

The invention will be explained in more detail according to the Examples and the Comparative Examples, which should not be construed as limiting the scope of the invention.

In the following Examples and Comparative Examples, the biosolubility was evaluated by the following method.

Evaluation of Biosolubility

Of the resulting inorganic fiber, an amount within the range of 25 mg was preciously weighed as the sample for evaluation.

Subsequently, this evaluation sample was put on a membrane filter made of PTFE (polytetrafluoroethylene) having a pore size of 0.1 μm. Further, on the top of the evaluation sample, a PTFE-made membrane filter having a pore size of 1 μm was put and fixed as a filter unit. To the filter unit, a physiological saline having a pH of 5.0 shown in Table 1 was circulated at a flow rate of 0.15 ml/min.

TABLE 1

| Composition of physiological saline | |
|---|---|
| | g/L |
| Sodium chloride | 6.778 |
| Calcium chloride | 0.022 |
| Sodium dihydrogen phosphate di-hydrate | 0.180 |
| Sodium hydrogen carbonate | 2.270 |
| Trisodium citrate dihydrate | 0.060 |
| Glycine | 0.454 |
| Ammonium chloride | 0.540 |
| 96% Sulfuric acid | 0.144 |
| Potassium dihydrogen citrate | 11.510 |
| Sodium hydroxide | 1.128 |

The physiological saline which was circulated the evaluation sample was collected in a tank provided below the filter unit. Due to the passage of the physiological saline of the evaluation sample, inorganic fiber components are eluted. While keeping the temperature of the physiological saline during the evaluation test at 37° C., which is the temperature of a body fluid, the inorganic fiber component eluate collected in the tank was taken out 24 hours after and 48 hours after the start of the test. The amount of the eluted fiber components was quantified by means of ICP emission spectroscopy, and the solubility was calculated based on this value.

In the case of the simple solubility, the fiber surface area may vary due to difference in fiber diameter. Therefore, the fiber diameter is separately calculated to obtain a fiber surface area. From this fiber surface area, the measured value of solubility, the real density of the fiber and the amount used of the sample, the solubility (ng/cm$^2$·h) per unit time and unit fiber surface area is calculated to obtain a dissolution speed. As for the dissolution speed, the speed 0 to 24 hours after the start of the test and the speed 24 to 48 hours after the start of the test were obtained.

Since the outer shape of the resulting inorganic fiber has an approximate columnar shape, the surface area of the inorganic fiber was calculated by obtaining the total side surface area on the assumption that the inorganic fiber has a columnar shape.

That is, if an assumption is made that the mass of the inorganic fiber is taken as M (g), the total length of the inorganic fiber is L (m), the average fiber diameter of the inorganic fiber is d (m) and the real density of the inorganic fiber is ρ (kg/m$^3$), the following formula (1) is established.

$$M = \pi \times d^2 \times L \times \rho / 4 \quad (1)$$

Further, the surface area A (m$^2$) of the inorganic fiber is represented by the formula (2).

$$A = \pi \times d \times L \quad (2)$$

From the formula (2), L=A/(π×d). If A is obtained by substituting L for the formula (1), the following formula (3) is obtained.

$$A = 4M/d\rho \quad (3)$$

The mass M(g) of the inorganic fiber was measured and the average fiber diameter d(m) of the inorganic fiber was measured by means of a scanning electron microscope (JSM-5800 LV, manufactured by JEOL, Ltd.). By substituting M, d and the theoretical real density 3.5 g/cm$^3$ (=3.5×10$^3$ kg/m$^3$) of spinel MgAl$_2$O$_4$ as the real density ρ to the above formula (3), the surface area A (m$^2$) of the inorganic fiber can be calculated.

The speed of dissolution in physiological saline obtained by the above-mentioned evaluation serves as an index of chemical resistance to a body fluid. The higher this value is, the lower the chemical resistance to the body fluid is and the lower adverse effects to the living body are exerted.

Example 1

An aqueous raw material solution for spinning was prepared by using a basic aluminum carboxylate represented by Al(OH)$_x$(RCOO)$_{3-x}$ (X is 1.7 and R has 0 to 2 carbon atoms) as the basic acid aluminum.

Specifically, to 100 parts by mass of an aqueous basic aluminum carboxylate solution having a concentration of 10.5 mass % in terms of Al$_2$O$_3$, 123.8 parts by mass of an aqueous magnesium acetate solution having a concentration of 5.7 mass % in terms of MgO and 9.5 parts by mass of silica sol having a silicon concentration of 20.5 mass % in terms of SiO$_2$ were added and mixed, followed by concentration, according to need. As a result, an aqueous raw material solution for spinning having a viscosity of 0.8 Pa·s was prepared.

When basic aluminum carboxylate, magnesium acetate and silica sol are respectively expressed in terms of Al$_2$O$_3$, MgO and SiO$_2$, (i.e. in terms of a metal oxide), the aqueous raw material solution for spinning comprises 54.0 mass % of basic aluminum carboxylate, 36.0 mass % of magnesium acetate and 10.0 mass % of silica sol relative to the total amount of basic aluminum carboxylate, magnesium acetate and silica sol.

Subsequently, by using the spinning apparatus 1 shown in FIG. 1, the above-mentioned aqueous raw material solution for spinning was subjected to spinning. When spinning, in a room kept at constant temperature and humidity, at a temperature of 25° C., the above-mentioned aqueous raw material solution for spinning was filled in the syringe 2. Thereafter, the liquid was supplied to the front end part of the nozzle 3. By applying a voltage of 6 to 13 kV from the high-voltage generating apparatus 4 which is electrically connected to a fixing part and the sample collection table 5 provided around the nozzle 3, the aqueous raw material solution for spinning was ejected from the front end of the nozzle 3, and was allowed to be fibrous. The fibrous products were collected on the sample collection table 5 of which the distance from the front end of the nozzle 3 had been adjusted to be 150 mm, whereby a crude inorganic fiber was obtained.

The thus obtained crude inorganic fiber was heated to 700° C. in an electric furnace in the atmosphere at a heating rate of 500° C./hour. Then, the crude inorganic fiber was fired by retaining for 2 hours, whereby an inorganic fiber was obtained.

The resulting inorganic fiber had an average fiber diameter of 1.4 μm, and comprised $Al_2O_3$ in an amount of 53.6 mass %, MgO in an amount of 36.9 mass % and $SiO_2$ in an amount of 9.5 mass %.

In order to evaluate the biosolubility of this inorganic fiber, the dissolution speed of the resulting inorganic fiber was measured by the above-mentioned method. The dissolution speed 0 to 24 hours after the start of the test was 2317 ng/cm$^2$·h and 747 ng/cm$^2$·h 24 to 48 hours after the start of the test. The results are shown in Table 2.

By using the composition analysis results of the resulting inorganic fiber, the melting point was calculated by thermodynamics equilibrium calculation. The melting point was found to be 1625° C.

Examples 2 to 8 and Comparative Example 1

Inorganic fibers were prepared in the same manner as in Example 1, except that the amount of the aqueous solution of the basic aluminum carboxylate, the amount of the aqueous solution of the magnesium acetate and the amount of silica sol in the aqueous raw material solution for spinning were adjusted such that the amount of $Al_2O_3$, the amount of MgO and the amount of $SiO_2$ in the resulting inorganic fiber become the values shown in Table 2.

For the resulting inorganic fiber, the average fiber diameter was obtained in the same manner as in Example 1, and biosolubility was also evaluated. In Example 6, only the dissolution speed 0 to 24 hours after the start of the test was measured.

The melting points of the inorganic fiber obtained in Examples 2 to 8 were measured in the same manner as in Example 1. The melting point was 1350° C. or more.

In Comparative Example 1, precipitates were generated when the aqueous raw material solution for spinning was prepared and the viscosity thereof was adjusted. As a result, spinning could not be conducted.

The results are shown in Table 2.

point of 1350° C. or higher, it was confirmed that they had high heat resistance.

On the other hand, it can be understood that the aqueous raw material solution for spinning in Comparative Example 1 was one which could not be fibrous.

INDUSTRIAL APPLICABILITY

According to the invention, it is possible to provide an inorganic fiber having a high dissolution speed in a living body and having excellent biosolubility, and heat resistance. Further, according to the invention, the inorganic fiber can be produced easily.

EXPLANATION OF THE SYMBOLS

1. Spinning apparatus
2. Syringe
3. Nozzle
4. High-voltage generation apparatus
5. Sample collection table

The invention claimed is:

1. An inorganic fiber comprising $Al_2O_3$, MgO and $SiO_2$, wherein the content of $Al_2O_3$ is 30 mass % or more and less than 81 mass %, the content of MgO is more than 19 mass % and 65 mass % or less, and the content of $SiO_2$ is 40 mass % or less, and wherein the total content of $Al_2O_3$, MgO and $SiO_2$ relative to the entire fiber is 98 mass % or more.

2. The inorganic fiber according to claim 1, wherein the content of $SiO_2$ is 9.2 mass % to 40 mass %.

3. The inorganic fiber according to claim 1, wherein the content of MgO is 22 mass % to 65 mass %.

4. A method for producing the inorganic fiber according to claim 1, comprising:

preparing a water-soluble aluminum compound as a raw material of $Al_2O_3$, a water-soluble magnesium compound as a raw material of MgO and a water-soluble or a water-dispersible silicon compound as a raw material of $SiO_2$, the aluminum compound being one or more selected from compounds represented by the following composition formula (I):

$$Al(OH)_xY_z \qquad (I),$$

TABLE 2

| | Composition (mass %) | | | Firing temperature | Average fiber diameter | Dissolution speed (0-24 hours after the start of measurement) | Dissolution speed (24-48 hours after the start of measurement) | Melting point |
|---|---|---|---|---|---|---|---|---|
| | $Al_2O_3$ | MgO | $SiO_2$ | (° C.) | (μm) | (ng/cm$^2$ · h) | (ng/cm$^2$ · h) | (° C.) |
| Ex. 1 | 53.6 | 36.9 | 9.5 | 700 | 0.93 | 2317 | 747 | 1625 |
| Ex. 2 | 74.6 | 25.4 | 0.0 | 700 | 0.82 | 171 | 92 | 1788 |
| Ex. 3 | 60.9 | 39.1 | 0.0 | 700 | 0.89 | 263 | 258 | 1809 |
| Ex. 4 | 44.2 | 28.9 | 26.9 | 700 | 0.94 | 3154 | 145 | 1381 |
| Ex. 5 | 38.3 | 61.7 | 0.0 | 700 | 1.11 | 732 | 1401 | 1809 |
| Ex. 6 | 33.5 | 57.3 | 9.2 | 700 | 0.80 | 2532 | — | 1625 |
| Ex. 7 | 66.5 | 23.3 | 10.2 | 700 | 1.30 | 466 | 548 | 1455 |
| Ex. 8 | 38.1 | 34.6 | 27.4 | 700 | 1.60 | 3033 | 368 | 1381 |
| Com. Ex. 1 | 28 | 42 | 30 | | | Could not be fibrous due to precipitation | | |

From the results shown in Table 2, the inorganic fibers obtained in Examples 1 to 8 each had a dissolution speed of 80 ng/cm$^2$·h or more which mean that they had excellent biosolubility. Further, since each inorganic fiber had a melting wherein X is a positive number more than 0 and less than 3;
Y is any one selected from a chlorine atom, an $NO_3$ group, an $SO_4$ group and a RCOO group; Z is 3–X when Y is a chlorine atom, an $NO_3$ group or an RCOO group, and (3−X)/2 when Y is an $SO_4$ group; and R is a hydrogen atom or a hydrocarbon group or hydroxyl group-containing hydrocarbon group having 1 to 10 carbon atoms, and when plural RCOO groups are present the Rs may be the same or different;

dissolving in an aqueous medium, in terms of a metal oxide, 30 mass % or more and less than 81 mass % of water-soluble basic acid aluminum, more than 19 mass % and 65 mass % or less of a water-soluble magnesium compound and 40 mass % or less of a water-soluble or water-dispersible silicon compound, relative to the total amount of raw materials, to form an aqueous raw material solution for spinning;

spinning the aqueous raw material solution to obtain a crude inorganic fiber; and firing the crude inorganic fiber.

5. The method for producing the inorganic fiber according to claim 4, wherein the firing is conducted at a temperature of 500° C. or higher and lower than a liquid phase generation temperature.

6. The method for producing the inorganic fiber according to claim 4, wherein the content of the water-soluble or water-dispersible silicon compound is 9.2 mass % to 40 mass % in terms of a metal oxide.

7. The method for producing the inorganic fiber according to claim 4, wherein the content of the water-soluble magnesium compound is 22 mass % to 65 mass % in terms of a metal oxide.

8. The method for producing the inorganic fiber according to claim 4, wherein the step of firing of the crude inorganic fiber is conducted in an atmospheric air or an oxidizing atmosphere.

9. The method for producing the inorganic fiber according to claim 4, wherein the step of spinning the aqueous raw material solution is conducted by an electrostatic spinning method.

* * * * *